United States Patent
Kerr

[15] 3,671,726
[45] June 20, 1972

[54] ELECTRO-OPTICAL APPARATUS FOR PRECISE ON-LINE MEASUREMENT OF THE THICKNESS OF MOVING STRIP MATERIAL

[72] Inventor: James Richard Kerr, Tigard, Oreg.
[73] Assignee: Morvue, Inc., Tigard, Oreg.
[22] Filed: May 23, 1969
[21] Appl. No.: 827,266

[52] U.S. Cl. ..................235/151.3, 250/219 TH, 356/108
[51] Int. Cl. .....................................................G01b 11/06
[58] Field of Search..............235/151.3, 61.11 E; 250/83.3, 250/219, 217, 222; 356/108, 161, 159, 209; 340/347

[56] References Cited

UNITED STATES PATENTS

| | | | |
|---|---|---|---|
| 3,244,206 | 4/1966 | Bossen | 144/209 |
| 3,378,676 | 4/1968 | Clement | 235/151.3 |
| 3,424,532 | 1/1969 | Briggs et al. | 356/108 X |
| 3,492,491 | 1/1970 | Beeh | 356/161 X |
| 3,510,664 | 5/1970 | Nichols | 356/209 X |

Primary Examiner—Malcolm A. Morrison
Assistant Examiner—Edward J. Wise
Attorney—Daniel P. Chernoff

[57] ABSTRACT

On-line apparatus for monitoring and determining the instantaneous thickness of a moving longitudinal strip of planar material simultaneously at several locations along the lateral cross-section thereof. The apparatus is particularly useful where the material is of non-uniform lateral cross-section and in addition is subject to flopping and undulatory movement in its travel past the monitoring station. The electro-optical system utilizes a pair of laser light sources, with associated beam splitter and lens systems, for focusing a plurality of spots of light of well-defined small diameter on the respective major surfaces of said material at locations along the lateral cross-section thereof, and then projecting the reflected images of said respective light spots onto corresponding detector units. Each of the detector units is in the form of a plurality of individual photo-sensors arranged in masked array to generate a binary-coded electrical output signal, the numerical significance of which is indicative of the displacement of the light image from a nominal position and thus is representative of the distance deviation of the surface of said material at each cross-section location from a predetermined reference plane. Arithmetic and logic elements next operate on the respective digital output signals from said detector units to derive resultant numerical measurements of the instantaneous thickness of said moving material at each of said lateral locations. In cases where one of the major surfaces of the moving material is constrained to a fixed plane, for example by having its bottom surface in contact with a moving conveyor bed, then distance deviation measurements need only be made at lateral locations on the other, unconstrained major surface of the material to determine the instantaneous thickness of the material at each of said locations.

17 Claims, 7 Drawing Figures

Patented June 20, 1972 3,671,726

BINARY IMAGE
DETECTOR

GRAY CODE IMAGE
DETECTOR

ELECTRO-OPTICAL APPARATUS FOR PRECISE ON-LINE MEASUREMENT OF THE THICKNESS OF MOVING STRIP MATERIAL

BACKGROUND OF THE INVENTION

This invention relates to apparatus for on-line precise monitoring of the thickness of moving strip material, such as wood veneer ribbon, which is subject to non-uniform thickness variations throughout its lateral cross-section and which, in many instances, is not constrained (such as by a conveyor bed) to movement in a fixed plane so that the material will flop and undulate in its movement past the monitoring station.

In the production of wood veneer, wherein a ribbon of wood of typically one-tenth to two-tenths of an inch in thickness is peeled off from a log by a veneer lathe, there is inevitably produced variations in the thickness of the ribbon. Pressure changes in the lathe nosebar as the heavy mass of the peeler log rotates, together with natural wanes and bumps in the log itself, combine to produce continuous thickness variations along both the length and width of the veneer ribbon.

In a typical run of veneer these thickness variations in the great majority of the veneer ribbon fall within a permissible range which conforms with industry standards and do not introduce any significant problems in the ultimate use of the veneer for plywood panel or other applications. However, there is inevitably a small percentage of the veneer in each run whose thickness variations exceed the applicable tolerance range, and this material must be spotted and diverted from the production stream of good veneer.

In a typical plywood plant on-line thickness monitoring of the veneer has hitherto been performed visually by a human operator who views the moving strip as it is peeled off from the log by the lathe and who manually actuates a cutting knife to clip out those portions of the veneer containing excessive thickness variations or other defects in the material, such as splits, breaks or large knotholes. However, as will be readily appreciated, the human eye is not particularly adapted for precise monitoring of thickness variations under such circumstances, especially when material is moving at relatively high speed in a continuous ribbon and a variation of one thirty-second of an inch or less might be critical. Furthermore, the thickness of the longitudinal strip of veneer ribbon is not uniform across its lateral width, thus requiring the human operator to continuously scan the entire surface of the veneer for excessive thickness variations. Frequently, an outsized or undersized veneer portion is not spotted until much later in the production process at the glue spreader stage, thus causing considerable loss of production time, material and labor in the processing of defective veneer material to such an advanced stage of plywood manufacture. For the foregoing reasons it is highly desirable that an on-line means be provided for automatically and precisely monitoring the thickness of the veneer ribbon at a point immediately after its peeling off by the lathe from the log and before there has been any considerable heat treatment or other processing of the ribbon in the course of its ultimate fabrication into plywood panel or other product.

Previous to the present invention some of the known techniques for on-line monitoring of the thickness of a moving strip of material include the use of mechanical fingers and rollers, strain gauges with associated roller sensors, and similar type mechanical and electro-mechanical devices utilizing physical contact between the thickness sensing device and the moving strip. In addition to their relative imprecision, such prior act devices, because of the frictional wear produced by the continuous contact with the moving material, constantly required readjustment and repair. Relatively recently, non-contact devices utilizing X-ray and nuclear radiation have been developed for measuring the thickness and other characteristics of moving material; however, such devices are not readily suitable for thickness monitoring of veneer because of the considerable variations in material density and other parameters due to the non-homogeneous nature of wood fiber.

SUMMARY OF THE INVENTION

The present invention is directed to an electro-optical apparatus for precision on-line monitoring and measurement of the thickness of a moving strip of planar material at a plurality of locations along its lateral cross-section. In an illustrative embodiment the apparatus is designed for operation with moving strip material which is not constrained by a conveyor surface to follow a given plane, in other words, the material is free to undulate or flop in a direction perpendicular to its line of travel as it passes by the thickness monitoring station. The invention, while described in the form of an apparatus for monitoring the thickness of wood veneer ribbon, is readily adaptable for the measurement of other strip material, such as steel, paper stock, etc., and, as hereinafter explained, may be readily modified into a more simplified form when dealing with material which is constrained, such as by a supporting conveyor web, from displacement in direction perpendicular to the line of travel.

The thickness monitoring apparatus of the present invention comprises an electro-optical system in which the respective displacements of the reflected images of a plurality of small-diameter light spots, in proportional response to corresponding displacements of a series of points on the major surfaces of the moving strip of planar material on which said light spots are focused, are sensed by photodetector means and converted into digitally-encoded electrical signals representative of the instantaneous respective locations of said surface points, relative to predetermined reference planes. More specifically, the apparatus utilizes one or more high-intensity light sources, exemplarily provided by a laser beam, together with a lens system and a number of beam-splitting mirrors sequentially positioned at spaced intervals in the path of the laser light and provided with increasing optical reflectivities so that the respective intensities of the light beam portions reflected by each of the mirrors are approximately equal. This optical system serves to focus a plurality of light spots of small diameter on the respective faces of the moving strip at spaced locations along the lateral width thereof. In situations where the moving strip material is not constrained to a fixed plane of travel, these spot images of light are formed on both major surfaces of the strip and are preferably aligned in one-to-one correspondence, so that each light spot is mated with a corresponding light spot on the obverse face of the material.

The reflected light from each of the spot images is gathered and focused by a respective second lens system on an associated detector unit. A cylindrical lens is employed in the second lens system to spread out the image of the reflected light spot into a narrow band of light on the face of the detector unit. Each of the detector units is comprised of a plurality of individual photo-sensors arranged in a masked array to function as an analogy-to-digital converter by generating a binary-coded electrical output signal which changes in digital increments in response to displacement of the reflected light image across the face of the detector unit. This movement of the light image over the face of the detector unit, due to a corresponding displacement of the light spot focused on the surface of the moving material, is representative of the distance deviation of the surface of said material at the respective light spot location from a reference plane positioned parallel to plane of travel of the moving strip. Thus, instantaneous variations in either the thickness of the moving material, or in its plane of travel, will produce a corresponding numerical signal variation at the output of the associated detector unit for each respective light spot location.

Suitable arithmetic and logic circuit elements are provided in the apparatus to receive the digital output signals from the respective detector units and to derive therefrom resultant numerical measurements of the instantaneous thickness of the moving strip material at each of the lateral spot locations. If desired, preset and adjustable tolerance limits on the upper and lower thickness dimensions of the material can readily be provided in the digital logic circuitry so as to produce an alarm or other actuating signal when the instantaneous thickness of the material falls outside the prescribed range.

In order to improve the resolution of the apparatus it is preferable that the masked array of photo-sensors in each of the detector units be arranged in a so-called Gray code configuration, rather than in conventional binary code. Such arrangement will eliminate any ambiguity in the digital output signal generated by the respective detector units in response to the movement of the reflected light image over the face thereof in those instances when the light image falls on the midline position between digital increments in the photo-sensor array. As will be more fully explained hereinafter, with a Gray code configuration for the photo-sensor array there will be a meaningful digital number produced at the output of the detector unit in such midline situations, rather than the meaningless number which would otherwise appear with a conventional binary code configuration. In those embodiments where a Gray code configuration is employed in the photo-sensor array, the computer circuitry of the apparatus further includes a Gray-to-binary converter to transpose the digital signals from the respective detector units into binary coded form so that they can thereafter be readily handled by conventional binary arithmetic and logic elements.

A further refinement of the present invention is that, in the typical case where space or other considerations prevent the use of the optimum geometrical arrangement between the two respective lens systems (i.e., a 90° angular orientation between the incident light and the reflected light of the spot image formed on the surface of the material), the plane of the detector unit is preferably tilted by a prescribed amount, relative to the axis of the second lens system, in order to minimize the defocusing effect on the reflected image as the surface of the moving material deviates from its nominal position.

It is therefore a principal objective of the present invention to provide a novel and improved apparatus for the precise on-line measurement and monitoring of the thickness of a moving strip of planar material, especially in those applications where the material is not constrained to longitudinal travel in a fixed plane.

It is a still further objective of the present invention to provide an automatic thickness monitor for a moving strip of planar material which is capable of instantaneously measuring the thickness of the material at a plurality of points across the lateral cross-section thereof.

It is yet another objective of the present invention to provide an on-line automatic thickness monitor for moving strip material which is inherently more accurate and reliable than any heretofore known.

It is a principal advantage of the present invention that an apparatus is utilized to accurately determine the instantaneous thickness of a moving strip material without the need for physical contact therewith.

It is another important advantage of the present invention that there is provided an on-line automatic thickness monitor for moving strip material which produces numerical readings in digital form of the instantaneous thickness of the moving material at a plurality of locations spaced across the lateral cross-section thereof and which also generates an actuating signal when any of said measurements deviates from an adjustable predetermined thickness range.

The foregoing and other objectives, features and advantages of the present invention will be more readily understood upon consideration of the following detailed description of the invention, taken in conjunction with the accompanying drawing,

DESCRIPTION OF THE PREFERRED EMBODIMENT

Figure 1:
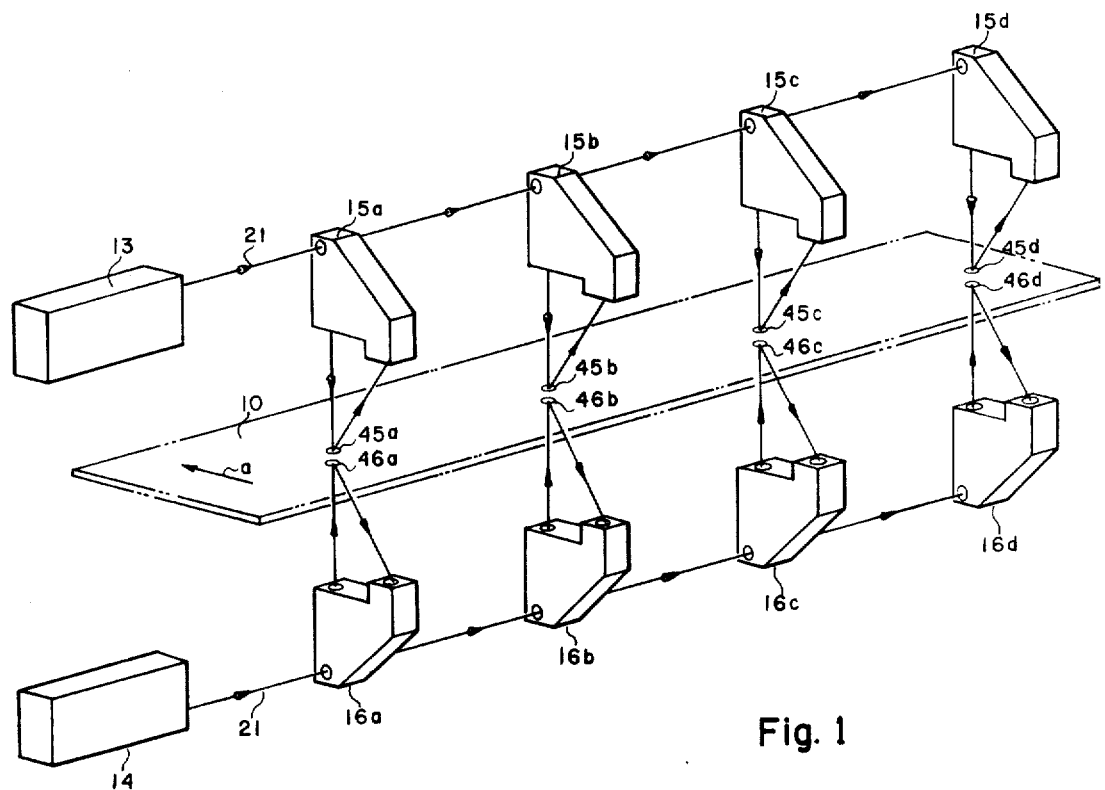
FIG. 1 is a pictorial perspective view of an illustrative embodiment of the on-line automatic thickness monitor of the present invention.

Referring now to the drawings there is shown in FIG. 1 an exemplary embodiment of a system employing the teachings of the present invention for automatically measuring and monitoring the thickness of a continuous strip of planar material 10 moving logitudinally in the direction indicated by the arrow $a$. A plurality of scanner units $15a \ldots 15n, 16a \ldots 16n$, are arranged at spaced locations transversely across the lateral width of the respective upper and lower surfaces of the strip material 10. The scanners $15a \ldots 15n$ on the upper side are aligned in a series optical path to receive light radiation from an associated light source module 13, and correspondingly, the lower group of scanners $16a \ldots 16n$ are similarly aligned in the series path of a light source module 14.

Figure 2:
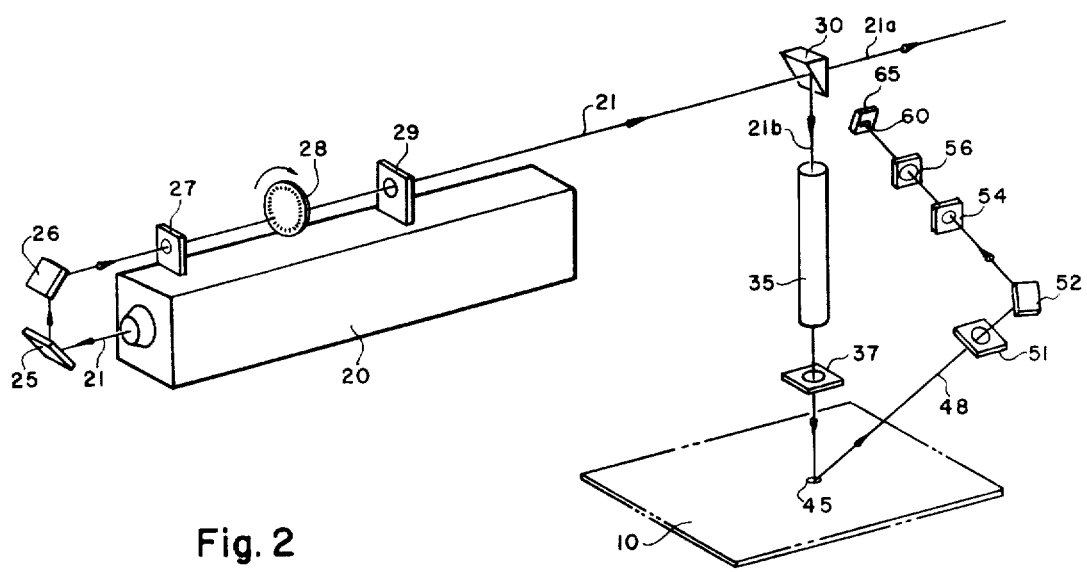
FIG. 2 is a pictorial schematic view of the optical system for a typical scanner unit of the automatic thickness monitor shown in FIG. 1.

Turning to FIG. 2 there is depicted therein the elements of the optical system for a typical one of the scanner units 15, 16. The light source module 13 or 14 comprises a laser 20 which may be of the continuous wave helium - neon type, such as Spectra-Physics model 120, emitting a continuous coherent light beam 21 of approximately 5 milliwatts of power in the visible red spectrum. Although not essential, a laser is preferable for use as the light source in the respective light modules 13, 14 because the spatial coherence of its emitted light enables a small spot diameter to be achieved over a very large depth of focus — an advantage which is not readily obtained with more conventional types of light sources. Further, the great intensity of light radiation provided by the laser in relation to its unit bulk is of considerable advantage in an application such as the present where beam intensity and compactness of size are of high importance.

After deflection by a pair of mirrors 25, 26 to change the beam's direction 180°, the laser light passes through a pair of lenses 27, 29 which act as a telescope to collimate and enlarge the light into a beam of approximately one-half inch in diameter. Interposed between the two lenses 27, 29 at the focal plane of the telescope is a rotating apertured disk 28 which acts as a light chopper to break the continuous laser light into a pulsating beam. The chopper 28 is utilized for the conventional purpose of producing an AC component in the light beam so as to enable the light detector portion of the system, which is hereinafter described, to more readily discriminate between the incident light from the laser and the ambient background light. As an alternative to the apertured disk 28, a tuning-fork light chopper, such as model L40 manufactured by the Electronics Division of Bulova Watch Company, could also be utilized to produce the desired alternating component in the light beam 21.

After emergence from the light source module 13 (or 14) the light beam 21 proceeds to the first scanner location 15a (or 16a) where it impinges on a beam-splitting prism 30. The prism 30 is partially-silvered so that a portion of the incident light beam 21a proceeds through the prism in its original direction, and the remaining portion 21b is deflected downward into a telescope 35.

Each of the beam-splitting prisms 30 in the respective series of scanner units 15a ... 15n of the upper system, and in the respective scanners 16a ... 16n of the lower system, possess progressively larger reflectivities, proceeding away from their corresponding light sources 13 and 14, so that the respective intensities of the reflected light beam portions 21b are approximately equal over the series of scanner units. In other words, assuming for example a total of 10 scanners spaced laterally over each surface of the strip material, the beam-splitting prism 30 at the first scanner location, i.e., 15a, would have a reflectivity of 10 percent, so that 90 percent of the incident light 21 from the laser source 20 would pass directly through the prism without reflection. At the second scanner location 15b the reflectivity of the beam-splitting prism 30 would be approximately one-ninth or 11 percent; at the third scanner location 15c the reflectivity would be one-eighth or 12.5 percent, and so on, until at the tenth and last scanner location 15, most remote from the light source, the reflectivity of the prism would be 100 percent and all of the remaining light would then be deflected downward into its respective telescope 35. In general, therefore, with $n$ number of scanner units disposed laterally across the surface of the moving strip material, the reflectivity of the beam-splitting prism 30 of the $j$th scanner unit away from the light source would be $$\frac{1}{n+1-j}.$$

Returning to the description of the optical system shown in FIG. 2, after the deflected beam portion 21b passes through the telescope 35 where it is focused down to a beam size of approximately 0.1 millimeter in diameter, it passes through a dust cover or window lens 37 and is incident as a target spot 45 on the surface of the moving strip 10. Scattered light from the target spot 45, after passage through a window lens 51 and a change in direction by mirror 52, is transmitted through a lens assembly formed of a pickup aperture lens 54 and a cylindrical defocusing lens 56. The target spot 45 which because of its small diameter very nearly approximates a point source, acts as an object for the pickup lens 54. Before imaging on the face of a photo-detector unit 65, the reflected light from the target spot 45 is magnified in one dimension only by the cylinder lens 56 to convert the image of the light spot 45, into a narrow line-like beam of light 60 extending across the face of the photo-detector unit. The detector unit 65 functions as a one-dimensional position detector which, in a manner to be described hereinafter, produces electrical digital signals indicative of the location of the image 60 relative to an axis on the face of the detector unit.

Figure 3:
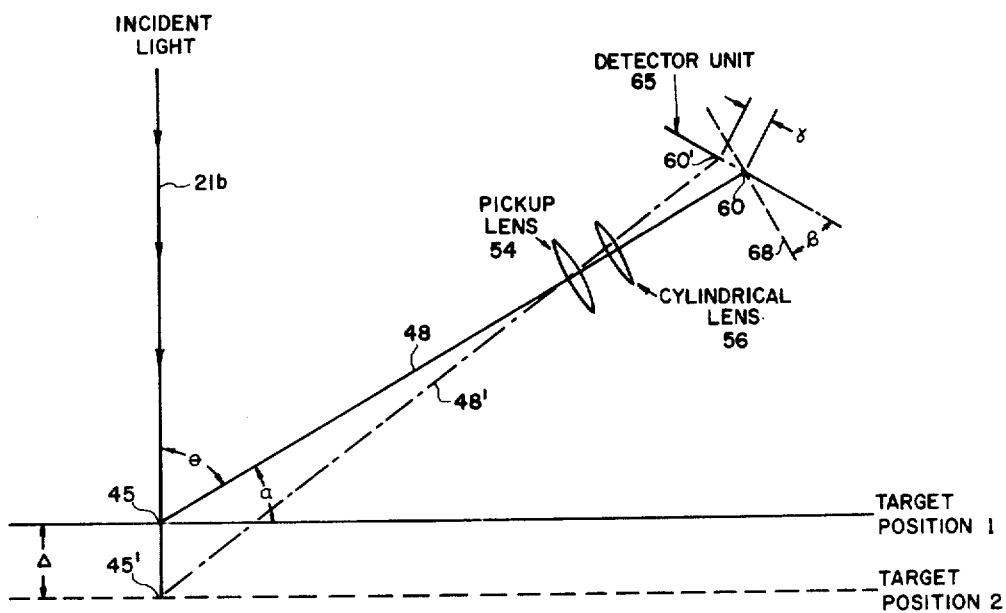
FIG. 3 is a schematic diagram illustrating certain geometrical relationships present in the optical system of a scanner unit of the automatic thickness monitor.

FIG. 3 is a geometric diagram illustrating certain optical relationships which are utilized by the scanner system to determine the instantaneous vertical position of the surface of the moving strip at each respective scanner location. The incident light 21b (that is, the light from the laser source which is reflected by the associated beam-splitting prism at the respective scanner location) is focused as a target spot 45 on the surface of the strip. At a first position of the strip surface, indicated as Target Position 1 in the diagram, the target spot 45 is reflected as a light beam 48 which passes through the pickup lens 54 and the cylindrical lens 56, and thence onto the face of the detector unit 65 where it appears as image 60. Assume next that the surface of the moving strip at this particular scanner location moves a distance $\Delta$ from its original position (Target Position 1) to a new position, designated as Target Position 2, due either to a change in the instantaneous thickness of the material, a dynamic displacement of the material relative to its plane of movement, or more typically a combination of both. At Target Position 2 the incident beam 21b is again focused onto the strip surface as a virtual point source of light 45'. The reflected light beam 48' from the new target spot 45' passes through the lens assembly 54, 56 and appears on the face of the detector unit as image 60' which itself is displaced by a distance $\gamma$ from the position of image 60 representing the previous target spot position.

Because of the finite diametric size of the target spot 45 (i.e., the target spot is something less than a perfect point), the inherent resolution of the optical system illustrated is not unlimited. Assuming a target spot diameter of size D, then, from trigonometric analysis, the relation between the image displacement $\gamma$ to the image size, and thus the inherent resolution of the system, is given by the following expression:

$$\frac{\text{Image displacement}}{\text{Image size}} = \frac{\Delta \sin \theta}{D \sin \alpha}$$

where, as illustrated in FIG. 3, $\Delta$ is the target spot displacement due to thickness variation or flop in the strip material, D is the diameter of the target spot 45, $\theta$ is the angle between the incident light 21b and the axis of the pickup lens system, and $\alpha$ is the angle between the target plane and the pickup system axis.

From the foregoing analysis it will be observed that when $\theta$ (the angle between the incident light and the axis of the pickup lens system) is 90°, the target spot 45 will always be a constant distance from the pickup lens 54, regardless of the movement $\Delta$ of the target plane, and under such circumstances there will be no defocusing effect of the image formed on the detector face as the surface of the strip is vertically displaced. Further, it will be noted that as $\alpha$ (the angle between the pickup system axis and the target plane) becomes smaller and approaches zero, the ratio of image displacement to image spot size becomes increasingly larger, thereby indicating that the inherent resolution of the system can be enhanced by positioning the pickup lens system as close as practicable to the plane of the target surface. However, due to practical and physical limitations, the optimal geometrical relationships referred to above cannot be obtained, and thus some compromise in the various desiderata will be necessary. In an operative embodiment of the thickness monitor which has been constructed, the optical system was arranged so that $\theta=\alpha=45°$; however, it will of course be recognized that other angular relationships could also be employed in the system with satisfactory results.

To compensate for the defocusing effect on the image which would ordinarily be produced by the variation in object-to-image distance due to the angle $\theta$ between the incident light 21b and the reflected light 48 not being 90°, the image plane formed on the face of the detector unit 65 is preferably tilted, as indicated in the diagram, by an angle $\beta$ with respect to the normal 68 to the axis of the pickup lens system. For the special case of $\theta=45°$ the proper amount of angular tilt $\beta$ can be readily calculated from knowledge of the degree of magnification M of the pickup lens system:

$$\tan \beta = M$$

The axial displacement $\gamma$ of the image 60 across the face of the detector unit 65 bears a virtually linear relationship to the vertical displacement $\Delta$ of the target spot 45 formed on the surface of the strip material. For small displacements of the target spot which lie within the depth of focus of the pickup lens 54 the relationship is $$\frac{\text{Image displacement } \gamma}{\text{Target spot displacement } \Delta} = M$$

Figure 4A:
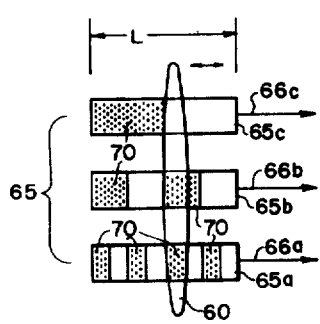
FIG. 4A is a schematic diagram illustrating an exemplary configuration of masked photo-sensor elements in a detector array which is arranged to produce a conventional binary-coded digital output signal.

As stated earlier, the image 65 of the Target Spot 45 is formed on the face of the detector unit 65 as an elongated oval due to the unidimensional enlarging effect of the cylindrical defocusing lens 56. As shown in FIG. 4A, each of the detector units 65 is formed from a parallel array of photosensor cells 65a ... 65n. The photosensor cells, which may for example be of the silicon solar type manufactured by Sensor Technology, Inc. of Van Nuys, California, are arranged in parallel, edge-to-edge contact so as to function as a one-dimensional binary image location detector. Each of the respective outputs 66a ... 66n of the image detector cells 65a ... 65n produces an output signal voltage when light from the target spot is incident on the face thereof. Through the use of an opaque mask of configuration indicated by the shaded areas 70, the masked photocell array 65 functions as a one-dimensional position detector of the image 60 to one part in N, where N is the number of photocell elements in the array.

For the three photosensors 65a, 65b, 65c shown in FIG. 4A, the resolution of the detector portion of the system would be one part in eight; in other words, the binary signal appearing on the respective output leads 66a, 66b, 66c of the detector unit 65 would fix the position of the image 60 to a particular eighth segment of the length L of the detector array. (In general, the resolution of a detector unit 65 with N parallel photocells would be $2^N$; that is, the signal appearing on the output leads 66a ... 66n would consist of one of $2^N$ possible binary signals, each of which would be uniquely associated with a particular segment of the length L of the image detector unit.) The light mask 70 is arranged so that the respective binary output signals on the three lead wires 66a, 66b, 66c would be as follows for the corresponding fractional segments of the detector length L proceeding from left to right in the diagram of FIG. 4A:

|  | 65 |
|  | c b a |
| ¼ or less | 0 0 0 |
| ⅛ to ¼ | 0 0 1 |
| ¼ to ⅜ | 0 1 0 |
| ⅜ to ½ | 0 1 1 |
| ½ to ⅝ | 1 0 0 |
| ⅝ to ¾ | 1 0 1 |
| ¾ to ⅞ | 1 1 0 |
| ⅞ to 1 | 1 1 1 |

(The above will be recognized as conventional binary coding.)

Adding additional photosensor cells 65d ... 65n to the detector array will increase the resolution of the unit exponentially so that the axial position of the image 60 on the face of the detector 65 can be determined with greater precision. In an actual embodiment of the system where the design objective was to measure a variation in the strip surface position over a range of 1 inch to a resolution of one part in 200 (or 0.005 inch), an array of eight photocells were employed. The modifications necessary to the configuration of the light mask 70 in order to accommodate additional photosensor cells are readily apparent from the nature of the pattern evidenced by the three-bit array shown in the diagram.

One major disadvantage of conventional binary coding of the image detector output in accordance with the arrangement shown in FIG. 4A is the ambiguity which results when the light beam 60, which necessarily possesses a finite width, falls on the midline between adjacent masked and unmasked segments in the photosensor array. In such cases the resulting number appearing at the output 66 of the photodetector unit 65 may be erroneous or, at the least, ambiguous. For example, if the image 60 should be positioned at a location corresponding to L/4 (i.e., one-quarter of the distance from the left-hand side of the detector array), there will be an output or "1" appearing on both leads 65a and 65b, as typically no provision is made in the photosensors for discrimination in light intensity above a certain minimum threshold level. Thus, the output 66 of the image detector, for the situation described where the light beam falls at the midline between the two segments will be "011" representing, from the truth table previously set forth, an erroneous reading of "⅜ to ½," rather than a reading of either "⅛ to ¼" or "¼ to ⅜."

Figure 4B:
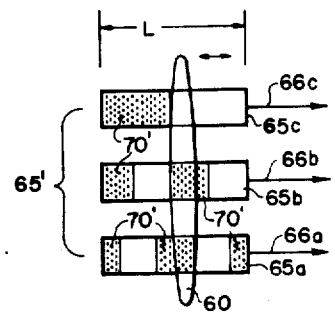
FIG. 4B is a schematic diagram of the photo-sensor array in a detector unit similar to that of FIG. 4A but with the elements arranged in a Gray code configuration.

In order to eliminate such erroneous readings of the image detector 65 under circumstances similar to those described, it is preferable to utilize an array of photosensor cells 65a ... 65n which are masked in a somewhat different configuration, as shown in the modification of FIG. 4B. In this latter diagram, the shaded areas 70' provided by the mask produce a binary output signal over the lead wires 66a ... 66n which is in the so-called Gray code form. For the three photosensor cells 65a, 65b, 65c shown, the output signals 66 for the eight segments of the detector into which the dimension L is divided are as follows:

|  | 65 |
|  | c b a |
| ⅛ or less | 0 0 0 |
| ⅛ to ¼ | 0 0 1 |
| ¼ to ⅜ | 0 1 1 |
| ⅜ to ½ | 0 1 0 |
| ½ to ⅝ | 1 1 0 |
| ⅝ to ¾ | 1 1 1 |
| ¾ to ⅞ | 1 0 1 |
| ⅞ to 1 | 1 0 0 |

With the Gray code arrangement of the photocells 65a ... 65n consecutive binary numbers differ by only a single bit, as no more than one bit position is changed at a time. In the example described previously in which the light beam image 60 falls on the L/4 position, the output 66 of a Gray-coded detector 65' would be either "001" (representing "⅛ to ¼") or "011" (representing "¼ to ⅜"). Thus the output reading of the Gray-coded detector unit would be correct, within the resolution accuracy of the detector system, regardless of the axial position of the image 60 on the face of the detector unit.

Modification of the shaded areas 70' provided by the mask on the face of the Gray-coded detector unit 65' to incorporate additional photosensor cells 65d ... 65n beyond the three shown in FIG. 4B would be readily apparent to those conversant in the computer art. As the binary output 66 of the detector unit 65' in the arrangement of FIG. 4B would be in Gray code, it would be highly desirable in the processing of the digital information to convert the output signal to conventional binary coding. Digital logic elements for performing this conversion are well known in the computer art and are described for example in a publication by the Engineering Staff of Texas Instruments, Inc., entitled "Transistor Circuit Design" (1963) at pages 487–489.

Returning momentarily to the overall system configuration shown in FIG. 1, it will be seen that the individual scanner units 15, 16 for the respective upper and lower surfaces of the moving strip 10 are arranged in one-to-one correspondence so that each pair of corresponding scanner units 15j, 16j are aligned at a particular location along the lateral width of the strip to simultaneously monitor the respective vertical positions of the upper and lower portions of the strip at that particular point in its cross-section. Thus each of the individual scanner units 15, 16 is continually generating a digitally-encoded numerical signal which represents the instantaneous vertical position of the respective upper or lower surface of the moving strip at the point where it passes beneath the corresponding scanner unit.

Figure 5:
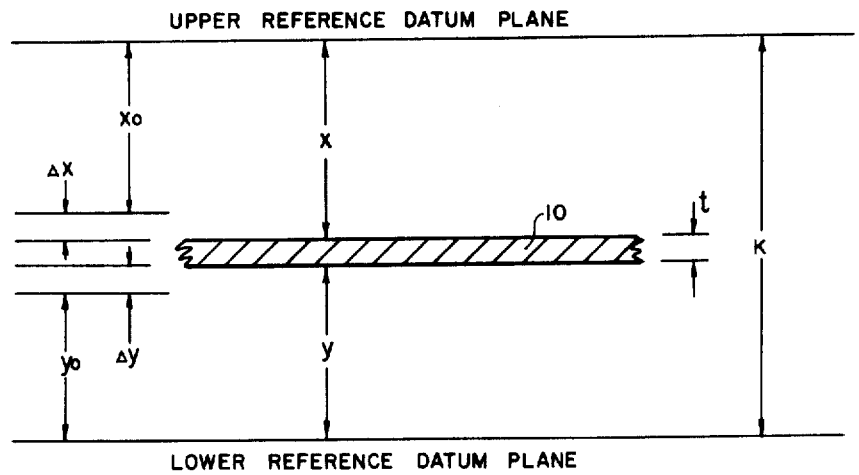
FIG. 5 is a schematic diagram illustrating certain geometrical relationships which are utilized by the computer circuitry of the apparatus of the present invention to determined thickness in applications where the moving strip material is not constrained to a fixed plane of travel.

From initial calibration of the system at the time the installation is made the numerical signals generated by the respective scanner units represent measurements of the vertical distance between the respective upper or lower surfaces of the strip to a fixed datum plane. FIG. 5 is a geometrical diagram illustrating the dimensional relationships involved in calculating the thickness of the moving strip from the information generated by the scanner units. In the installation of the automatic thickness monitoring system of the present invention an initial calibration is made to establish the upper and lower reference datum planes which are fixed in space and separated apart by a known distance K. The output of a respective upper scanner unit 15j is next calibrated for a target spot produced on the upper face of the strip material 10 at a predetermined nominal distance $x_o$ from the upper reference datum plane. Similarly, a corresponding nominal distance $y_o$ for the lower surface target spot is also established by calibration. Then, for any instantaneous thickness and dynamic position of the strip 10, the output readings of the respective upper and lower scanner units 15j, 16j will be $\Delta x$ and $\Delta y$ respectively representing the instantaneous deviations of $x$ and $y$ from their nominal settings. From the foregoing data the thickness $t$ of the strip can then be calculated:

$$t = K - (x_o + \Delta x) - (y_o + \Delta y) = K' - (\Delta x + \Delta y)$$

Figure 6:
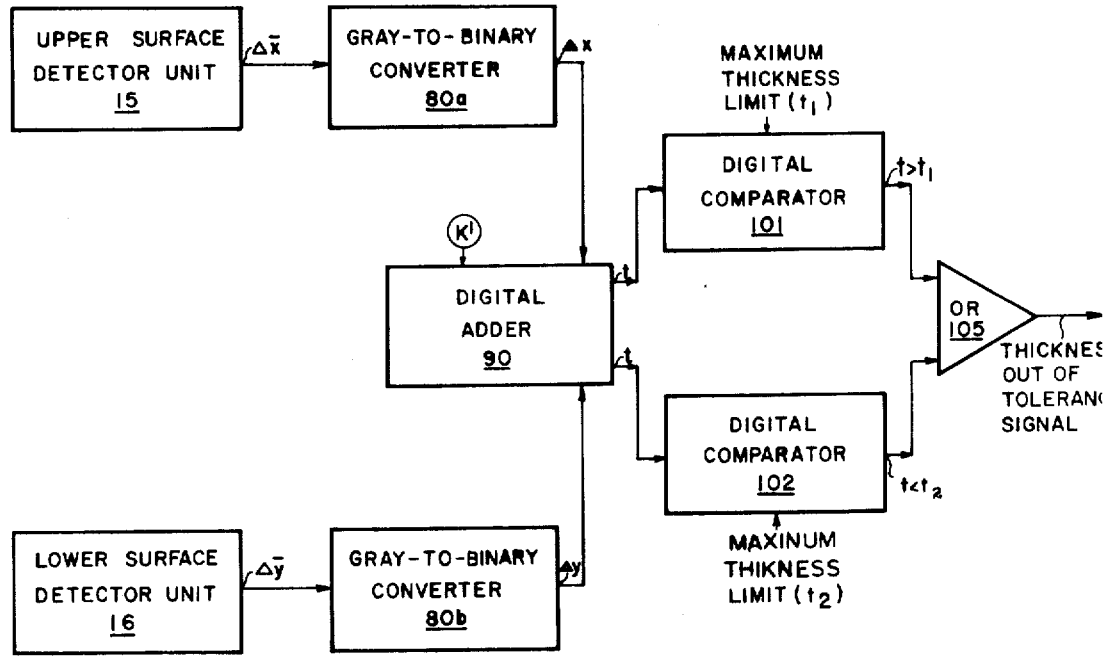
FIG. 6 is a schematic block diagram showing the arrangement of arithmetic and logic elements in the computer portion of the automatic thickness monitor.

FIG. 6 shows an exemplary arrangement of arithmetic and logic elements in the digital computer portion of the system for operating on the numerical readings from the respective scanner units to generate an output signal representative of the instantaneous thickness $t$ of the moving strip material at each respective scanner location, and for thereafter comparing the thickness reading with predetermined tolerance limits in order to generate an actuating signal in the event that the strip thickness should fall outside a prescribed range. The computer elements shown are for a single upper and lower scanner location on the lateral cross-section of the strip, and it will be understood that analogous circuitry would be provided for each of the other scanner locations.

At a typical scanner location the detector unit 15 for the upper surface generates a Gray-coded digital number $\overline{\Delta x}$ representative of the instantaneous distance $x$ of the upper surface of the strip from the reference datum plan. This digital number is passed through a logic converter 80a which transforms it into a conventional binary-coded number $\Delta x$ for ease in subsequent processing of this data signal. In corresponding fashion the output number $\Delta y$ representative of the instantaneous distance $y$ between the lower surface of the strip and a reference data plane is derived by an associated detector unit 16 and similarly transformed into binary-coded form by an associated converter 80b. The two signals indicative of the instantaneous vertical positions of the respective upper and lower surfaces of the strip at the scanner location are then supplied to a digital adder unit 90 which performs the necessary operations on the input information to derive the value of the instantaneous thickness $t$ in accordance with the mathematical expression previously stated.

The binary number at the output of the adder 90 representing the value $t$ is next fed to the respective inputs of a pair of digital comparators 101 and 102. In the first comparator 101, an adjustable maximum thickness limit $t_1$ has been preset so that an output signal is produced only when the instantaneous measured thickness $t$ is greater than $t_1$. Correspondingly, the second digital comparator 102 compares the instantaneous value of the thickness $t$ with an adjustable lower thickness limit $t_2$ to produce an output signal when the thickness is less than a minimum prescribed value. The respective outputs from the digital comparators 101 and 102 are thereafter fed as inputs to an OR element 105 to provide a "thickness out-of-tolerance" signal when the instantaneous measured thickness $t$ falls outside the limits $t_1$ and $t_2$. The output from the OR element 105 can be utilized, for example, as an actuating signal for operating a marking device or a cutting knife to clip out the portion of the moving strip material whose thickness is out-of-tolerance. Thus the system described functions to automatically monitor the thickness of the moving strip at a plurality of lateral locations independently of any dynamic variation in its plane of travel.

It will be recognized that, in applications where the moving strip material is constrained to a fixed plane of travel such as a supporting conveyor bed, only the instantaneous position of points on the upper surface of the moving strip material need be monitored by the scanner units, as there would be no variation in the dynamic position of the strip. Thus, in such applications, only the upper portion, i.e., the light source 13 and the associated scanner units 15a . . . 15n of the system shown in FIG. 1 would be required, and the computer circuitry portion of the system would be correspondingly simplified.

What is claimed is:

1. Apparatus for monitoring and determining the instantaneous position of a surface of a moving strip of material comprising:
  a. means for projecting a spot of light on the surface of said material,
  b. means for gathering reflected light from said spot formed on said surface and projecting a real image of said spot on a plane, and
  c. photodetection means for determining the position of said image on said plane relative to a predetermined point on said plane, said photodetection means providing a quantified electrical signal output indicative of said image position and representative of the instantaneous relative position of said strip surface at the cross-sectional location where said light spot is incident thereon.

2. The apparatus set forth in claim 1 characterized in that said electrical signal output of said photodetection means is in the form of a digital number numerically representative of said image position, and further including (d) digital computer means with associated arithmetic and logic circuitry for converting said output signal from said photodetection means into a digital signal numerically representative of the instantaneous thickness of said strip at said cross-sectional location.

3. The apparatus of claim 1 adapted for an application where said strip is not constrained to a fixed plane of travel and characterized in that a pair of devices each comprised of means (a), (b) and (c) are arranged at a cross-sectional location on said strip for determining the position of respective opposed surfaces thereof in order to provide output signals which are indicative of the instantaneous thickness of said strip at said cross-sectional location.

4. The apparatus of claim 3 further characterized in that the instantaneous thickness of said strip is measured at a plurality of locations along the cross-section thereof by providing a respective pair of devices comprised of means (a), (b) and (c) at each said location, and that means (a) is comprised of a single light source with associated beam-splitting prisms for providing all of the light spots projected on a respective surface of said strip.

5. The apparatus of claim 4 in which there are $n$ number of cross-sectional locations on said strip at which the instantaneous thickness is to be measured and characterized in that the reflectivity of a beam-splitting prism associated with a location which is a number $j$ away from said light source is substantially in accordance with the formula:

$$\text{Reflectivity of the jth prism} = \frac{1}{n+1-j}.$$

6. Apparatus for monitoring and determining the instantaneous position of a major surface of a moving longitudinal strip of planar material which is subject to variations in thickness comprising:
  a. light source means for projecting a spot of light of small diameter, on the order of 5 millimeters or less, on a major surface of said material,
  b. image-forming means for gathering reflected light from said spot formed on said surface and projecting a real image of said spot on a plane, said means including a pickup lens and a cylindrical defocusing lens for spreading out the image of said light spot into a narrow band of light, and
  c. photodetection means situated in said image plane for determining the position of said image relative to a predetermined point on said plane, said photodetection means comprising a plurality of individual photo-sensor cells arranged in an array for generating a binary-coded electrical output signal which changes in digital increments in response to displacement of the position of said image across the face of said photodetection means, whereby said digital output signal from said photodetection means is representative of the positional deviation of said surface of said strip at said cross-sectional location from a predetermined reference plane.

7. The apparatus set forth in claim 6 characterized in that said array of photo-sensor cells in said photodetection means is adapted to produce a Gray-coded digital signal output, and conversion means are provided to transform said Gray-coded signal into a conventional binary-coded signal.

8. The apparatus set forth in claim 6 adapted for an application where said strip is not constrained to a fixed plane of travel and characterized in that a pair of devices, each comprised of light source means (a), image-forming means (b) and photodetection means (c), are arranged at a cross-sectional location on said strip for determining the position of respective major surfaces thereof, and the digital output signals produced by the respective photodetection means are supplied to digital computer means having associated arithmetic and logic circuitry for converting said respective photodetection output signals into a digital signal numerically representative of the instantaneous thickness of said strip at said cross-sectional location.

9. The apparatus of claim 8 further characterized in that the instantaneous thickness of said strip is measured at a plurality of locations along the cross-section thereof by providing a respective pair of devices comprised of means (a), (b) and (c) at each said location, and that light source means (a) is comprised of a laser with associated beam-splitting prisms for providing all of the light spots projected on a respective major surface of said strip.

10. The apparatus of claim 8 further characterized in that said digital computer means compares said signal representative of the instantaneous thickness of said strip at said cross-sectional location with predetermined minimum and maximum limits and generates an actuating signal in the event the measured thickness value falls outside said limits.

11. The apparatus of claim 6 characterized in that, in situations where the angle ($\theta$) between the incident light from said light source means (a) forming the spot on said surface of said strip and the reflected light from said spot gathered by said image-forming means (b) is not 90°, then the plane on which said image of said spot is formed is tilted by an appropriate angle ($\beta$) with respect to the normal to the optical axis of said pickup and cylindrical lens system of said image-forming means to compensate for the defocusing effect which would ordinarily be produced on said image by the variation in object-to-image distance in said image-forming lens system as said spot moves in response to positional displacement of said strip surface.

12. The apparatus of claim 11 further characterized in that the angle $\theta$ is substantially 45°, and the angle of tilt $\beta$ of the image plane is substantially in accordance with the expression:

$$\tan\beta = M,$$

where $M$ is the degree of magnification of said image-forming lens system.

13. The apparatus of claim 6 further characterized in that said light source means (a) includes a light chopper for producing a pulsating component to said projected light spot.

14. Apparatus for monitoring and determining the position of an object comprising:
  a. means for projecting a spot of light on said object,
  b. means for gathering reflected light from said spot formed on said object and projecting a real image of said spot on a plane, and
  c. photodetection means for determining the relative position of said image on said plane, said photodetection means comprising a plurality of individual photo-sensor cells arranged axially in said plane and each generating a respective electrical signal when said light spot image is incident thereon whereby the resultant output of said photodetection means is indicative of said image position and representative of the relative position of said object at the point where said light spot is incident thereon.

15. The apparatus set forth in claim 14 further including means enabling said photodetection means to distinguish said reflected light from ambient background light.

16. The apparatus set forth in claim 14 wherein said light-projection means includes a laser producing a continuous-wave coherent light beam.

17. The apparatus set forth in claim 14 wherein said projected light is directed against said object so as to be incident at substantially right angles to the surface thereof.

* * * * *

UNITED STATES PATENT OFFICE
CERTIFICATE OF CORRECTION

Patent No. 3,671,726                 Dated June 20, 1972

Inventor(s) James Richard Kerr

It is certified that error appears in the above-identified patent and that said Letters Patent are hereby corrected as shown below:

In drawing FIG. 6, below element 102, change legend "MAXINUM THIKNESS LIMIT ($t_2$)" to read --MINIMUM THICKNESS LIMIT ($t_2$)--;

adjacent to element 105, legend should read --THICKNESS OUT OF TOLERANCE SIGNAL--.

Col. 1, line 69, change "contact" to --contacting--.

Signed and sealed this 26th day of December 1972.

(SEAL)
Attest:

EDWARD M. FLETCHER, JR.
Attesting Officer

ROBERT GOTTSCHALK
Commissioner of Patents

Disclaimer 3,671,726.—*James Richard Kerr*, Tigard, Ore. ELECTRO-OPTICAL APPARATUS FOR PRECISE ON-LINE MEASUREMENT OF THE THICKNESS OF MOVING STRIP MATERIAL. Patent dated June 20, 1972. Disclaimer filed June 17, 1981, by the assignee, *The Coe Manufacturing Co.*

Hereby enters this disclaimer to claims 14–16 of said patent.

[*Official Gazette November 29, 1983.*]

REEXAMINATION CERTIFICATE (165th)
United States Patent [19]
Kerr

[11] B1 3,671,726

[45] Certificate Issued  Feb. 21, 1984

[54] ELECTRO-OPTICAL APPARATUS FOR PRECISE ON-LINE MEASUREMENT OF THE THICKNESS OF MOVING STRIP MATERIAL

[75] Inventor: James R. Kerr, Tigard, Oreg.

[73] Assignee: Coe Manufacturing Co., Painesville, Ohio

Reexamination Request:
No. 90/000,205, May 25, 1982

Reexamination Certificate for:
Patent No.: 3,671,726
Issued: Jun. 20, 1972
Appl. No.: 827,266
Filed: May 23, 1969

Certificate of Correction issued Dec. 26, 1972.

Disclaimers of Claims 14–16 filed Jun. 17, 1981. (1036 O.G. 51)

[51] Int. Cl.$^3$ ............................................. G01B 11/06
[52] U.S. Cl. ................................... 364/563; 364/469; 250/559; 250/571; 356/1; 356/381
[58] Field of Search .................. 250/216, 222 R, 559, 250/571; 364/561, 562, 563; 356/1, 4, 381

[56] References Cited

U.S. PATENT DOCUMENTS

| | | | |
|---|---|---|---|
| 2,379,496 | 7/1945 | Saunier | 88/1 |
| 2,429,066 | 10/1947 | Kuehni | 88/14 |
| 2,506,946 | 5/1950 | Walker | 177/352 |
| 3,016,464 | 1/1962 | Bailey | 250/219 |
| 3,017,512 | 1/1962 | Wolbert | 250/83.3 |
| 3,137,756 | 6/1964 | Gunther et al. | 88/14 |
| 3,187,185 | 6/1965 | Milnes | 250/222 |
| 3,263,087 | 7/1966 | Goldman et al. | 250/224 |
| 3,286,032 | 11/1966 | Baum | 179/1 |
| 3,355,934 | 12/1967 | Foster | 73/71.3 |
| 3,364,813 | 1/1968 | McKinney | 88/14 |
| 3,514,534 | 5/1970 | Korpel | 178/7.5 |
| 3,667,846 | 6/1972 | Nater | 356/120 |

OTHER PUBLICATIONS

Massey, "Study of Vibration Measurement by Laser Methods", NASA Doc. N6627953, CR-75643 (1966), pp. 28, 29 and 30.

Texas Instruments, Inc., "Transistor Circuit Design", pp. 487–489 (1963).

*Primary Examiner*—Edward J. Wise
*Attorney, Agent, or Firm*—Chernoff & Vilhauer

[57] ABSTRACT

On-line apparatus for monitoring and determining the instantaneous thickness of a moving longitudinal strip of planar material simultaneously at several locations along the lateral cross-section thereof. The apparatus is particularly useful where the material is of non-uniform lateral cross-section and in addition is subject to flopping and undulatory movement in its travel past the monitoring station. The electro-optical system utilizes a pair of laser light sources, with associated beam splitter and lens systems, for focusing a plurality of spots of light of well-defined small diameter on the respective major surfaces of said material at locations along the lateral cross-section thereof, and then projecting the reflected images of said respective light spots onto corresponding detector units. Each of the detector units is in the form of a plurality of individual photo-sensors arranged in masked array to generate a binary-coded electrical output signal, the numerical significance of which is indicative of the displacement of the light image from a nominal position and thus is representative of the distance deviation of the surface of said material at each cross-section location from a predetermined reference plane. Arithmetic and logic elements next operate on the respective digital output signals from said detector units to derive resultant numerical measurements of the instantaneous thickness of said moving material at each of said lateral locations. In cases where one of the major surfaces of the moving material is constrained to a fixed plane, for example by having its bottom surface in contact with a moving conveyor bed, then distance deviation measurements need only be made at lateral locations on the other, unconstrained major surface of the material to determine the instantaneous thickness of the material at each of said locations.

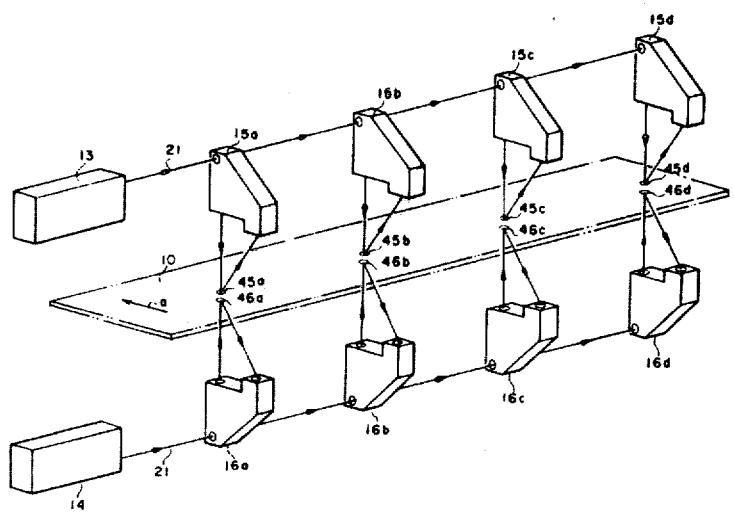

REEXAMINATION CERTIFICATE ISSUED UNDER 35 U.S.C. 307.

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 6–13 is confirmed.

Claims 14–16 were previously disclaimed.

Claims 1 and 17 are determined to be patentable as amended:

Claims 2–5, dependent on amended claims, are determined to be patentable.

New claims 18–20 are added and determined to be patentable.

1. Apparatus for monitoring and determining the instantaneous position of a surface of a [moving] strip of material *moving in a path of travel past said apparatus*, comprising:
   (a) means for projecting a [spot] *point* of light on [the] *said* surface of said *moving strip* [material];
   (b) means for gathering [reflected] light *reflected from said projected point* [spot formed on said surface] and projecting *said gathered light to form* a real image of said [spot] *point* on a plane; and
   (c) photodetection means for determining the position of said image on said plane relative to a predetermined point on said plane, said photodetection means providing a quantified electrical signal output indicative of said image position and representative of the instantaneous relative position of said [strip] surface at the [cross-sectional] location *of said projected point of light* [where said light spot is incident thereon].

17. The apparatus set forth in claim 14 wherein said projected light is directed against said object *as said object moves in a path of travel past said apparatus, and wherein said spot of light is substantially in the form of a point of light which is projected so as to be incident at substantially right angles to* [the] *a* surface [thereof] *of said object.*

*18. An apparatus for monitoring and determining the instantaneous position of a surface of a strip of material moving in a path of travel past said apparatus, said strip having a surface characteristic producing scattering or diffuse reflection of light incident thereon, comprising:*
   *(a) means for projecting a point of light on said surface of said moving strip;*
   *(b) means for gathering light diffusely reflected from said projected point and projecting said gathered light to form a real image of said point on a plane; and*
   *(c) photodetection means for determining the position of said image on said plane relative to a predetermined point on said plane, said photodetection means providing a quantified electrical signal output indicative of said image position and representative of the instantaneous relative position of said surface at the location of said projected point of light.*

*19. An electro-optical apparatus for monitoring and determining the instantaneous positions of a plurality of discrete locations on a surface of a strip of material moving in a path of travel past said apparatus, said apparatus comprising:*
   *(a) a plurality of projecting means for projecting respective points of light on said surface locations, wherein at least a pair of said projecting means are aligned substantially transversely to the direction of said path of travel;*
   *(b) a plurality of gathering means, each gathering means associated with a respective projecting means for gathering, from said surface, light reflected from the point projected by said respective associated projecting means and for projecting said gathered light to form a real image of said point on an image plane; and*
   *(c) a plurality of photodetection means, each photodetection means associated with a respective gathering means for determining the position of the image projected by said respective associated gathering means on said image plane, each said photodetection means providing a quantified electrical signal output indicative of said image position and representative of the instantaneous relative position of said surface at the location of the point of light projected by said respective associated projecting means.*

*20. An apparatus for monitoring and determining the position of a surface of an object as said surface moves past a monitoring location, said surface having a characteristic producing scattering or diffuse reflection of light incident thereon, said apparatus comprising:*
   *(a) means for projecting a point of light on said surface;*
   *(b) means for gathering light diffusely reflected from said point formed on said surface and projecting a real image of said point on a plane; and*
   *(c) photodetection means for determining the relative position of said image on said plane, said photodetection means comprising a plurality individual photosensor cells arranged co-linearly in said plane and each generating a respective electrical signal when said image is incident thereon such that the resultant output of said photodetection means is indicative of said image position and representative of the relative position of said surface at the location where said point of light is incident on said surface.*

* * * * *